C. M. MANLY.
CONTROLLING MECHANISM FOR POWER VEHICLES.
APPLICATION FILED FEB. 4, 1911.

1,132,665.

Patented Mar. 23, 1915.
3 SHEETS—SHEET 1.

Attest.
Inventor.
Charles M. Manly

C. M. MANLY.
CONTROLLING MECHANISM FOR POWER VEHICLES.
APPLICATION FILED FEB. 4, 1911.

1,132,665.

Patented Mar. 23, 1915.
3 SHEETS—SHEET 3.

UNITED STATES PATENT OFFICE.

CHARLES M. MANLY, OF BROOKLYN, NEW YORK.

CONTROLLING MECHANISM FOR POWER-VEHICLES.

1,132,665. Specification of Letters Patent. Patented Mar. 23, 1915.

Application filed February 4, 1911. Serial No. 606,615.

*To all whom it may concern:*

Be it known that I, CHARLES M. MANLY, a citizen of the United States, residing at No. 113 Montague street, Brooklyn, in the county of Kings and State of New York, have invented a new and useful Controlling Mechanism for Power-Vehicles, of which the following is a specification.

My invention relates to motor vehicles and particularly to devices for stopping such vehicles.

One object of my invention is to provide means for automatically causing a motor vehicle to stop on striking a person or other obstruction in its path of movement.

A further object of my invention is to provide means whereby the operator may at will nullify the automatic action of the device so that the vehicle will keep in motion after engaging an obstruction.

A further object of my invention is to so construct the stopping device that the operator may at any time stop the vehicle without interfering with the automatic controlling mechanism.

A further object of my invention is to provide a stop mechanism of the character described which is simple in construction and efficient in operation.

In the accompanying drawings I have illustrated a preferred embodiment of my invention, but it is to be understood that my invention is not limited to the details of construction shown but covers all modifications and variations of such details as properly fall within the scope of the appended claims.

Figure 1:
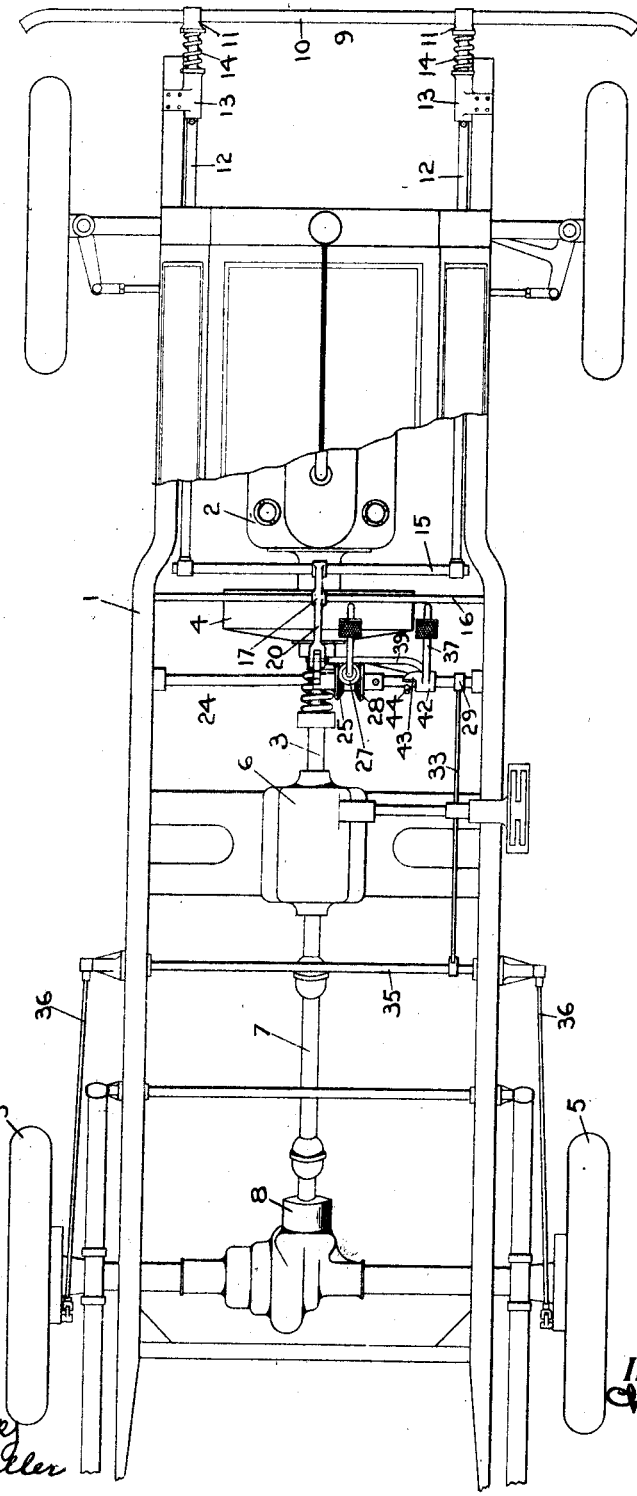
Figure 2:
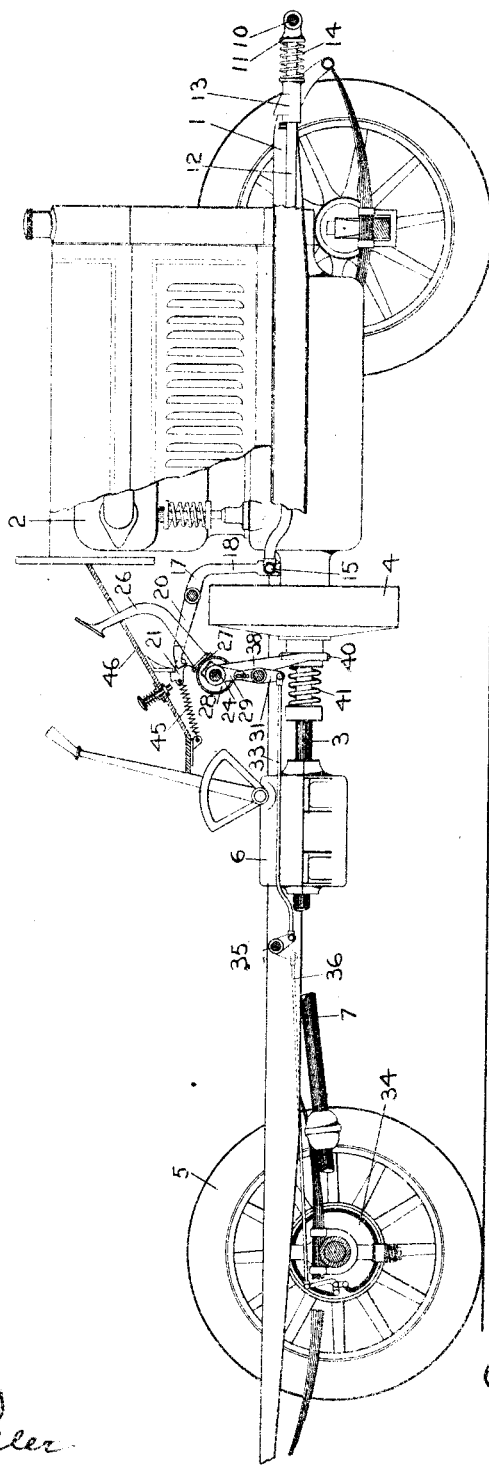
Figure 3:
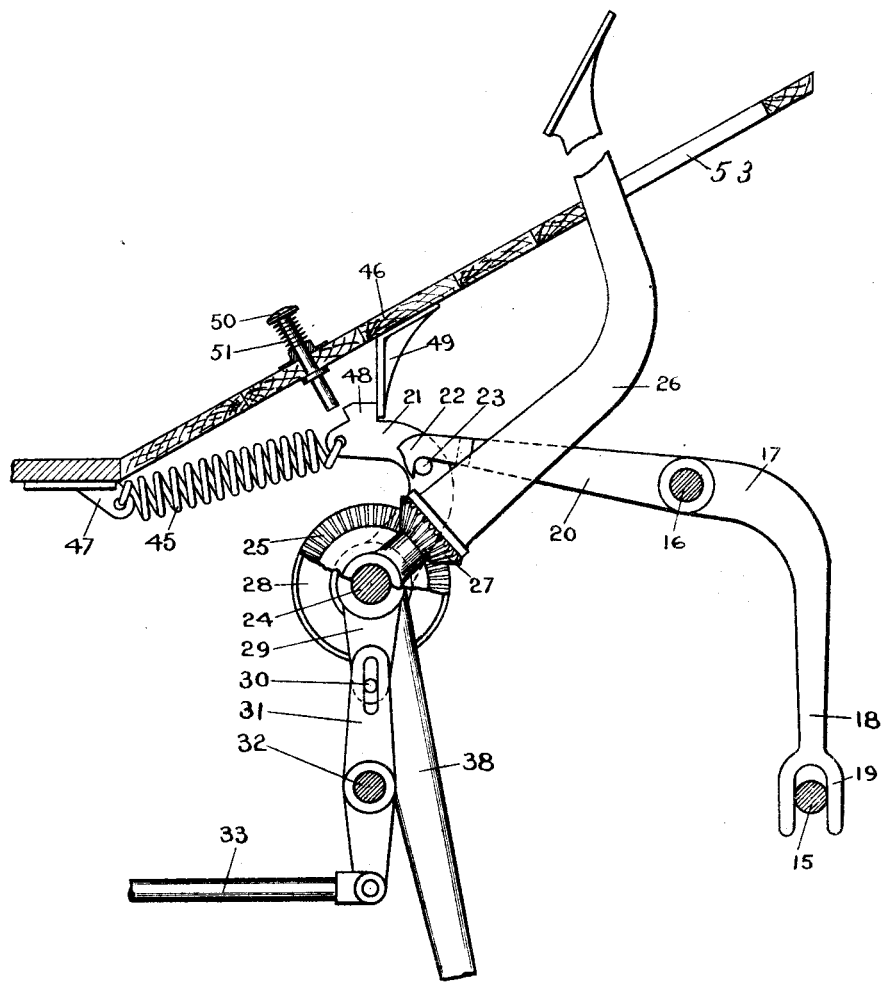

In the drawings, Figure 1 is a plan view of a chassis of a motor vehicle equipped with a stopping device embodying my invention, with the foot board and certain attached parts removed. Fig. 2 is a side elevation of the same, certain parts being shown in section. Fig. 3 is a detail view hereinafter referred to.

In the drawings, in which like reference characters indicate like parts throughout the several views, 1 indicates the frame of the vehicle and 2 the engine, here shown as of the internal combustion type and mounted at the forward end of the frame. Back of the engine and adapted to connect the engine shaft to the intermediate shaft 3 is the usual clutch 4. The shaft 3 is connected to the rear wheels 5 to drive the same through the usual variable speed gear 6, jointed shaft 7 and differential 8. At the front of the vehicle a fender 9 is provided comprising a transverse rod 10 attached by means of sleeves 11 to the ends of two longitudinally extending rods 12, mounted to slide in bearings 13, attached as shown to the frame 1.

Encircling the rods 12 and arranged between the sleeves 11 and the bearings 13, are two compression springs 14 adapted to hold the fender yielding against movement toward the body of the vehicle. The other ends of the rods 12 extend rearwardly beyond the engine and are connected by a transverse rod 15. Above the rod 15 and substantially parallel thereto, a rod or shaft 16 is fixedly supported in the frame 1 and mounted for oscillation on the shaft 16, near its middle point is a bell-crank lever 17 having a depending arm 18 provided with a fork 19 engaging the rod 15 of the fender. The other arm 20 of the bell-crank extends rearwardly and is bifurcated as shown to receive the upper end of an arm 21 and is provided with hooks 22 (only one of which is shown) engaging over the projecting ends of a pin 23 carried by the upper end of the arm 21, the arrangement of the parts being such that rearward movement of the fender, as produced, for instance by the engagement of the fender with an obstruction oscillates the bell-crank 17 thereby raising the hooks 22 from the pin 23. The arm 21 is loosely mounted on a shaft 24 rotatably mounted in the frame to the rear of the clutch 4 and is rigidly attached to or formed integral with the hub of a beveled gear wheel 25 also freely rotatable on the shaft 24. Adjacent the gear 25 and rotatable on the shaft 24, a pedal arm 26 is mounted and on the pedal arm a beveled gear 27 meshing with the gear 25, is rotatably supported. A third beveled gear 28 is fixed to the shaft 24 adjacent the pedal arm 26 and meshing with the gear 27 carried thereby. Also fixed to the shaft 24, near the end of shaft, is a depending arm 29 having a pin and slot connection 30 with the upper end of a brake operating lever 31 pivotally supported on a bracket 32 attached to the frame. Connected to the lower end of the lever 31 is a rod 33, which rod is adapted to operate the brakes 34 through the usual connecting shaft 35 and rods 36 on forward movement of the rod 33.

Loosely mounted on the shaft 24 is a pedal lever 37 having a downwardly extending arm 38 formed with a lateral extension 39 provided with a fork 40 adapted to engage the hub of the movable member of the clutch 4. The members of the clutch 4 are held in engagement in the usual manner by means of a spring 41, the arrangement of the parts being such that rotation of the lever 37 in a clockwise direction around the shaft 24 as shown in Figs. 2 and 3 moves the movable clutch member away from the fixed member against the tension of the spring 41. The hub 42 of the pedal lever 37 is provided with a lug 43 adapted to be engaged by a pin 44, on the shaft 24 so that clockwise rotation of the shaft 24 will rotate the pedal lever with it while the pedal lever may be rotated in a clockwise direction independently of the shaft 24. Attached to the upper end of the arm 21 is one end of a spring 45 adapted when the arm is released from the hooks 22 to turn the arm and its attached gear 25 in a counter clockwise direction as shown in the drawings, the other end of the spring being connected to the footboard 46 at 47. Projecting from the upper end of the arm 21 is a lug 48 which is adapted to engage a fixed stop 49 depending from the footboard to limit the forward movement of the arm against the tension of the spring 45 and mounted in the footboard immediately above the arm 21 when in the position where it is engaged by the hooks 22, is a push bolt 50 adapted when depressed against the tension of its spring 51 to engage behind the lug 48 on the upper end of the arm to hold the arm against movement when desired for a purpose hereinafter set forth. As shown, the pedal arm 26 projects through a slot 53 in the footboard the rear edge of which slot limits the rearward movement of the pedal arm to the position shown in the drawing.

I will first describe the automatic operation of the device when the vehicle engages an obstruction in its path of movement. The cross bar 10 of the fender 9 being the most advanced portion of the vehicle will engage an obstacle or person in the path of movement of the vehicle and continued movement of the vehicle will cause the bell-crank lever 17 to rock on its shaft 16 through its connection at 19 with the rear rod 15 of the fender thereby releasing the arm 21. The spring 45 then draws the arm 21 rearwardly turning it and the gear 25 in a counter clockwise direction on the shaft 24. The gear 25 is in mesh with the gear 27 on the pedal arm but as the pedal arm is against the footboard 46 at the rear end of its slot, the gear 27 is held against bodily movement with the gear 25 and is therefore rotated on the pedal arm as an axis, thereby rotating the gear 28 and the shaft 24 to which the gear 28 is attached, in a clockwise direction. This clockwise rotation of the shaft 24 causes the pin 44 to engage the lug 43 on the hub of the clutch lever 37 and turn the lever in a clockwise direction, thereby releasing the clutch 4 by moving the driven member away from the driving member against the tension of the spring 41, the spring 45 being sufficiently stronger than the spring 41 to effect this result. Simultaneously with the release of the clutch as above described the brakes are set and the vehicle brought to a stop. The arm 29 being rigidly attached to the shaft 24 is turned with the shaft in a clockwise direction, and through its pin and slot connection 30 with the lever 31, turns said lever in a counter clockwise direction thereby pulling the brake operating rod 33 forwardly which movement, as previously described, expands the brakes 34 against the driving wheels 5. The vehicle is now at rest with the spring 45 holding the clutch disengaged and the brakes set. Should the operator desire to start the vehicle after the obstruction is removed, he first presses on the pedal arm 26 turning said arm and the gear 27 carried thereby in a clockwise direction around the shaft 24. Now as the gear 27 is in mesh with the gear 25 and also with the gear 28 it tends to rotate both said gears in a clockwise direction, but as the gear 28 has already been moved in that direction to the limit permitted by the brake mechanism, it now acts as a stationary rack for the gear 27 causing the said gear to turn on the pedal arm and turn the gear 25 and the arm 21 against the tension of the spring 45 with twice the speed of the pedal arm 26 until the lug 48 on the arm 21 engages the stop 49, and the hooks 22 again engage the pin 23. The operator then releases the pedal 26 and, the spring 45 being now held out of action by the hooks 22, the brakes are free to contract and the spring 41 causes the clutch members to engage, the pedal arm being returned to its original position.

When the operator desires to stop the vehicle he can do so by merely pressing the pedal arm 26 forward, turning the arm and the gear 27 in a clockwise direction. The gear 25, being now held stationary by the engagement of the lug 48 on arm 21 with the fixed stop 49, acts as a rack for the gear 27 so that the gear 27 turns the gear 28 and the shaft 24 in a clockwise direction at twice the speed of the pedal arm, releasing the clutch and setting the brake in the manner described above. Should the operator release the pedal the vehicle will be again set in motion as previously described, but should he desire to keep the vehicle stationary for some length of time or to leave the vehicle he may do so by shifting the gears of the variable speed gear out of mesh in the usual manner before releasing the pedal. If it is desired to prevent the automatic operation of the stop mechanism on encountering an obstruction, as when the vehicle is to be used to push an obstacle out of its path, the operator depresses the push bolt 50 into engagement with the lug 48 on the arm 21 thereby holding the arm against movement when the hooks 22 are disengaged from the pin 23 by the operation of the fender. When the vehicle is clear of the obstacle the fender resumes its forward position and the hooks again engage the pin. The operator may then release the push bolt 50 and the parts will be set for automatic operation as before. The clutch may be disengaged without setting the brakes, by pressing on the pedal of the clutch lever 37, turning the lever in a clockwise direction around the shaft 24. In this movement the lug 43 on the hub of the clutch lever merely moves away from the pin 44 and therefore does not turn the shaft 24.

I have shown my stop mechanism applied to a road vehicle but it is to be understood that I do not limit myself to its use in vehicles of this class, as it may obviously be applied to any self-propelled vehicle provided with means for shutting off the power and for stopping it.

I claim—

1. In a motor vehicle, the combination of a driving mechanism, a driving wheel, a clutch between said mechanism and said wheel, said clutch having a control member for direct operation by the driver to release the clutch, a power operated device for actuating said releasing means, a latch for holding said power operated device against movement, and a fender movably supported by said vehicle and operatively connected to said latch.

2. In a motor vehicle, the combination of a driving mechanism, means for rendering said driving mechanism inoperative, a spring for actuating said means, a latch for holding said spring under tension, a fender movably supported by said vehicle and operatively connected to said latch, manually operatable means for rendering said driving mechanism inoperative, and means operated by said manually operated device for placing said spring under tension.

3. In a vehicle, the combination of a brake, means whereby said brake may be directly applied by the driver of the vehicle, a power operated device for operating said brake applying means, means for holding said power operated device against movement, said power operated device being connected to said brake applying means to permit manual operation of the brake without affecting said power operating device, and a fender movably supported on the said vehicle and operatively connected to the said means.

4. In a vehicle, the combination of a brake, a spring for actuating said brake, a latch for holding said spring under tension, a fender carried by the vehicle, means for operatively connecting said fender and said latch, a manually operatable device for actuating said brake, and connections between said device and said spring whereby said spring may be placed under tension by movement of said device.

5. In a motor vehicle, the combination of a driving motor, a driving wheel, a clutch between said wheel and motor, a brake for said vehicle, means for operating said brake and clutch comprising a gear wheel, a second gear wheel, a spring for actuating said second gear wheel, a fender movably supported by said vehicle, a latch for holding said spring under tension operatively connected to said fender, and a pedal pivotally supported on said vehicle and provided with a gear wheel meshing with both said first mentioned gear wheels.

6. In a motor vehicle comprising a motor, driving wheels, a clutch between said motor and driving wheels, and a brake mechanism, the combination of means adapted for direct operation by the driver of the car for releasing said clutch and applying said brake, a source of power, mechanism adapted to be operated by said power for actuating said clutch releasing and brake applying means, a fender protruding in front of said vehicle and movable relative thereto, and means operated by said fender for causing the said power to operate said mechanism, substantially as described.

7. In a motor vehicle, the combination of a driving mechanism, a clutch interposed in said mechanism, a spring for holding said clutch engaged, a pedal operatably connected to said clutch for releasing the same, a movable fender carried by the vehicle, connections between said fender and said clutch whereby movement of the fender actuates the clutch releasing means, said fender operating mechanism and said pedal being interconnected so that the movement of one does not affect the position of the other.

8. In a motor vehicle, the combination of a driving mechanism, a clutch interposed in said mechanism, a spring for holding said clutch engaged, means for releasing said clutch embodying a differential mechanism, a pedal connected to one element of said differential, and a fender operated device connected to another element thereof.

CHARLES M. MANLY.

Witnesses:
E. J. Feeney,
Ada I. Miller.